(12) United States Patent  
Royston et al.

(10) Patent No.: US 7,931,306 B2
(45) Date of Patent: Apr. 26, 2011

(54) VENTED GAS RISER APPARATUS

(75) Inventors: James M. Royston, Pittsburgh, PA (US); John A. Samudovsky, Elizabeth, PA (US)

(73) Assignee: Energy Control Systems, Inc., Pittsburgh, PA (US)

( * ) Notice: Subject to any disclaimer, the term of this patent is extended or adjusted under 35 U.S.C. 154(b) by 0 days.

(21) Appl. No.: 12/800,267

(22) Filed: May 11, 2010

(65) Prior Publication Data

US 2010/0264643 A1 Oct. 21, 2010

Related U.S. Application Data

(60) Division of application No. 12/383,767, filed on Mar. 25, 2009, now Pat. No. 7,753,412, which is a continuation-in-part of application No. 12/077,628, filed on Mar. 19, 2008, now Pat. No. 7,740,284.

(51) Int. Cl.
*F16L 11/12* (2006.01)

(52) U.S. Cl. .... 285/45; 285/13; 285/123.3; 285/148.13; 285/924

(58) Field of Classification Search .............. 285/13–15, 285/45, 123.3, 123.15, 148.13, 148.28, 236, 285/256, 924; 405/47, 129.57, 129.7, 129.85, 405/157, 183.5; 138/105, 113, 114; 137/312
See application file for complete search history.

(56) References Cited

U.S. PATENT DOCUMENTS

| | | | |
|---|---|---|---|
| 3,869,150 A | 3/1975 | Brown | |
| 3,987,820 A | 10/1976 | Alweitz | |
| 4,132,083 A | 1/1979 | McGrath | |
| 4,279,435 A | 7/1981 | Alweitz | |
| 4,284,297 A | 8/1981 | Godkin | |
| 4,449,853 A | 5/1984 | Mennella et al. | |
| 4,482,170 A | 11/1984 | Jacobson et al. | |
| 4,932,810 A | 6/1990 | Austin | |
| 4,971,477 A | 11/1990 | Webb | |
| 5,135,264 A * | 8/1992 | Elliott-Moore | 285/2 |
| 5,326,137 A | 7/1994 | Lorenz et al. | |
| 5,366,260 A | 11/1994 | Wartluft | |
| 5,590,914 A | 1/1997 | Platner et al. | |
| 5,692,785 A | 12/1997 | Wartluft et al. | |
| 5,934,711 A | 8/1999 | Gady | |
| 6,039,066 A | 3/2000 | Selby | |
| 7,125,052 B2 | 10/2006 | Robinson et al. | |
| 7,806,442 B2 * | 10/2010 | Baxi et al. | 285/242 |
| 2003/0214133 A1 | 11/2003 | Robinson et al. | |

* cited by examiner

*Primary Examiner* — James M Hewitt
*Assistant Examiner* — Gwendolyn D Fournet
(74) *Attorney, Agent, or Firm* — Thomas R. Shaffer (57) ABSTRACT

A vented gas riser for use in a system for conducting pressurized gas through a gas carrier pipe from a gas supply source line located below ground level to a delivery point disposed above ground is provided. A fluid tight gas riser protective casing is disposed around said carrier pipe and creates a gas escape passageway in an elongate annular space between the carrier pipe and the casing. Any gas which leaks from the gas carrier pipe is captured in the gas escape passageway. A riser transition head, which includes at least one vent passageway, provides a fluid connection with said gas escape passageway and with the atmosphere such that any gas which leaks in the vicinity of the gas escape passageway can escape through the at least one vent into the atmosphere.

7 Claims, 11 Drawing Sheets

VENTED GAS RISER APPARATUS

This application is a divisional application of U.S. patent application Ser. No. 12/383,767 filed Mar. 25, 2009 now U.S. Pat. No. 7,753,412 which is a continuation-in-part of U.S. patent application Ser. No. 12/077,628 filed Mar. 19, 2008 now U.S. Pat. No. 7,740,284.

BACKGROUND OF THE INVENTION

1. Field of the Invention

The present invention relates to a vented gas riser apparatus. More specifically, it relates to a vented gas riser apparatus which includes a buried containment chamber in combination with a vent passageway to allow for gas which leaks into the containment chamber to be directed into the atmosphere in at an above ground location. In another embodiment, the present invention also relates to a vented gas riser which provides a vent passageway to allow for gas which leaks into an extended gas escape passageway at any location along the length of a carrier pipe to be directed into the atmosphere in at an above ground location.

2. Description of the Prior Art

A variety of prior art patents for various natural gas meter riser systems are known in the industry. For example, the following patents each describe various configurations of natural gas risers:

Godkin, U.S. Pat. No. 4,284,297 discloses a meter riser where the upper end of the plastic tubing and metal pipe casing are adjacent and structurally secured to each other in a sealed fashion by a plastic transition adapter and a cooperating metal fitting. In column 4 lines 63 through 65 a gas seal for preventing leakage of the fluid flowing from the gas main to the gas meter is provided between the adapter 20 and fitting 40 by the compressed O-rings 26.

Lorenz et al, U.S. Pat. No. 5,326,137 discloses a gas riser comprising a pipe nipple, casing, adaptor sleeve, tube and stiffener. In FIG. 2 and described in column 4 lines 14 through 22 first and second seal members 50, 52 are typically disposed between the inner tube and outer casing of the double walled riser. The first or upper seal member 50 limits the flow of the fluid between the tube 40 and the outer casing 30. Moreover, the second seal member 52 is often times used to prevent water and dirt from entering the annular space between the tube and casing at an area disposed underground.

Platner et al, U.S. Pat. No. 5,590,914 discloses a gas riser including an adapter having plural inner grooves. Axial advancement of a stiffener acts as a mandrel to physically deform the gas line into the grooves and provide a secure, sealed arrangement. As taught in column 3 lines 12 and 13, a pair of spacers 50, 52 provide a sealed arrangement between the inner and outer conduits 30, 40.

Robinson et al, U.S. Pat. No. 7,125,052 discloses a riser assembly which includes a seal assembly interposed between the inner casing and the adapter for sealing therebetween. A gripping assembly holds the inner casing in the adapter. The seal assembly is described in column 6 lines 13 through 27 and is defined by a first and second seal member 104, 106 interposed between the conduit 22 and the adapter 30 for sealing therebetween. Seals 104, 106 prevent the passage of fluid there past in either axial direction between the outer surface of the conduit 22 and the adapter 30. Additional details are given.

Jacobson et al, U.S. Pat. No. 4,482,170 discloses a gas riser which includes annular resilient seal which frictionally engages the exterior of the conduit abutting the annular collar. The resilient seal engages the tapered portion, and the annular collar pressing into engagement with the tapered portion and compressing the resilient seal against the retaining ring, the O.D. of the conduit and the I.D. of the iron pipe. Described in column 3 line 61 through 63 the tapered portion 66 is frictionally engaged by the resilient seal 36 to provide a gas impermeable seal there between. A ground water sealing means 58 includes a resilient gasket 80 is described in column 4 line 7 through 10.

Gady, U.S. Pat. No. 5,934,711 discloses a mold shot riser element with O-ring sealing which allegedly provides improved sealing between an inner pipe and an outer pipe of the riser apparatus. Referring to column 3 lines 35 to 39 the sealing elements 12 include a plurality of O-rings 30 and a cylindrical sealing gasket 32. The sleeves 24, 26, 28 define locating means for the O-rings 30 and gasket 32 which serves to capture the sealing elements and retain them in place. Gady also teaches at column 4 lines 27 through 35 that a seal 60 which is schematically illustrated in FIG. 5 limits the flow of fluid between the inner and outer pipes such that an annular space 62 between the inner and outer pipes below the seal 60 is not filled with pressurized gas. Only the limited annular space 64 above the seal 60 is filled with the pressurized gas. The seal 60 is preferably located above ground level. Thus, the outer pipe 14 acts as a carrier of fluid only for a small portion if its length above ground level and above the seal. Other details are provided at line 36 through 50.

Alewitz, U.S. Pat. No. 4,279,435 discloses a gas riser apparatus which includes gasket seals 140 and 142. As described in column 3 lines 43 to 47, in the preferred embodiment of FIG. 9, ribs 144 and 146 extend a degree sufficient to indent or displace material of the gasket seals 140, 142 in order to provide for sealing. Rib 148 similarly provides for sealing and locking of the members 112 and 134.

Wartluft, U.S. Pat. No. 5,366,260 and Wartluft et al., U.S. Pat. No. 5,692,785 disclose two known forms of plastic pipe couplers.

A common characteristic and feature of most, if not all, known gas riser systems is the provision of a riser casing which is sealed at an above ground location to some type of riser transition head (to which a meter is generally attached) so as to prevent any natural gas from escaping the system at the surface level. Historically, it has been considered to be a safety feature to provide a system which essentially provides a backup containment system at the surface so that in the unlikely event of a small gas leak at the meter connection, such leak would be captured between the gas carrier pipe and the protective riser casing and would likely seep into the earth at a location more distant from the building at which the meter is located.

An inherent problem with such a system, however, is that once gas leaks into the ground, because of a variety of geological formations which are not known and which are not predictable, it is difficult to predict where and how the natural gas will migrate. It is possible, that natural gas because of earth disturbances or other geological conditions will migrate and pool into a location underneath or near the building or structure thus leading to the possibility of a catastrophic explosion which would destroy the building.

It is important to bear in mind that these systems are designed so that the connection from a gas supply line source to a gas carrier pipe which leads to a delivery point at the meter location are designed not to leak at all and in most cases do not in fact leak. Thus, the present invention is directed only to a very small class of circumstances where a leak might occur. Such a leak could likely occur at one of two possible locations. The first location would be the point of connection between the gas supply source line and the gas carrier pipe of the riser and a second location would be the connection between the gas carrier pipe of the riser and the delivery point at the meter. In both of these cases, the type of leak might be either a fast and uncontrollable failure or might be a very slow seeping type leak. The present invention is directed only to situations where a slow seeping type leak might occur. While the concept of the present invention could possibly reduce the chances of an explosion in the event of a more rapid leak, the present invention is not designed for such circumstance and would be unlikely to provide adequate protection in such instances.

Contrary to the teachings of the prior art, the present invention teaches that rather than trying to either contain the leaked natural gas in a secondary containment casing system or to direct such leaks away from the gas riser down into the ground, that it is preferable to direct the leak to occur through a vent provided at a known location above ground near the meter. This would allow for the slow leak to be more likely to be detected and would allow the gas to be dispersed into the atmosphere thus reducing the chance of a catastrophic failure.

SUMMARY OF THE INVENTION

In the simplest form of the invention a vented gas riser for use in a system for conducting pressurized gas through a gas carrier pipe from a gas supply source line located below ground level to a delivery point disposed above ground is disclosed. A fluid tight gas riser protective casing around a carrier pipe creates a gas escape passageway in a space between the carrier pipe and the casing. A containment chamber is provided below ground level at the connection between the gas supply source line and the gas carrier pipe to create a confined space whereby any gas which leaks into the containment chamber is directed into the gas escape passageway. A riser transition head is also provided, which includes at least one vent passageway which provides a fluid connection with the gas escape passageway and with the atmosphere so that any gas which leaks into the containment chamber is directed through the gas escape passageway and through the at least one vent and into the atmosphere.

More specifically the present invention provides:

A vented gas riser apparatus for use in a system for conducting pressurized gas from a gas supply source line located below ground level to a delivery point disposed above ground level comprising: An elongated gas carrier pipe, said carrier pipe having a first pipe end disposed below ground level and sealingly connected at a first point of connection to said gas supply source line and having a second pipe end disposed above ground and sealingly connected to said delivery point whereby pressurized gas may flow through said carrier pipe from said gas supply source to said delivery point; a generally cylindrical fluid tight gas riser protective casing, said casing having a first casing end disposed below ground level and second casing end disposed above ground level, said casing disposed around said carrier pipe and creating a gas escape passageway in an elongate annular space between said carrier pipe and said casing; a containment chamber disposed below ground level, said containment chamber surrounding said first point of connection and creating a confined space which has, as its only egress, a fluid connection to said gas escape passageway whereby any gas which may leak from said first connection point will be captured by said containment chamber and directed into said gas escape passageway; and a riser transition head having a first head end sealingly connected to said delivery point and having a second head end connected to said second casing end, said second head end including at least one vent passageway which provides a fluid connection with said gas escape passageway and with the atmosphere whereby any gas which leaks into said containment chamber is directed through said gas escape passageway and through said at least one vent and into the atmosphere.

Preferably, said gas carrier pipe is formed of polyethylene.

Preferably, said containment chamber is formed of a tube of polyethylene having a diameter larger than said first point of connection and having rubber cap members which form a sealing connection at a first chamber end with said gas supply source line 20 and form a sealing connection at a second chamber end to said riser casing.

In one embodiment of the invention, said containment chamber is formed of a football shaped elastomeric tube having a larger diameter over said first point of connection and tapering to a smaller diameter at each end thereof with one end sealingly clamped to said gas supply source line and an opposite end sealingly clamped to said riser casing. In this embodiment, preferably a protective outer sleeve provided over said containment chamber.

In another embodiment, a containment chamber is formed of a two pre-molded chamber halves of a polyethylene material which slip fit together with and O-ring to form a football shaped containment chamber having a larger diameter over said first point of connection and tapering to a smaller diameter at each end thereof with one end sealingly connected to said gas supply source line by a tight fitting rubber boot and an opposite end sealingly connected to said riser casing by a tight fitting rubber.

In yet another embodiment of the invention, said containment chamber is formed by a coupling member which comprises a coupling sleeve which is sealingly connected to said riser casing and a threaded coupling nut which provides a seal onto said gas supply sources line and by means of a compression ring, load ring, and seal members whereby when said coupling nut is screwed and tightened onto said coupling sleeve a sealed containment chamber is formed.

Preferably, said riser transition head includes a riser casing sleeve into which into which a plurality of crimps are provided to connect said head to said riser casing with said at least one vent passageway being formed by the space between adjacent crimps. Preferably, said at least one vent passageway further comprises at least five vent passageways formed between adjacent crimps and preferably eight passageways.

Preferably, the size of the at least one vent passageway is controlled by the geometry and pressure applied by a crimping machine whereby a desired flow of gas can be allowed to flow out of said at least on vent passageway with a passageway small enough to provide a minimum risk of contamination by dirt, bugs or other debris.

Preferably, said at least one vent passageway is open to the atmosphere at a location above ground level and said passageway directs the flow of any gas from the containment chamber downwardly toward the ground level.

The vented gas riser apparatus of the present invention has a vertical oriented portion which is typically 2 to 3 feet in length which allows the transition head to be located above ground level and allows the carrier pipe to be buried at a safe depth (below the frost level) which will prevent damage to the same. In addition to the vertical portion, the gas riser typically has a horizontal portion which is buried beneath the ground at said safe depth and which extends only a short distance (less than 10 feet and more typically less than 5 feet) to allow a joining or coupling with a gas supply line which comes from a more distant distribution line (typically at the street or curb as many distribution lines follow roadways). Thus, the vented gas riser is most typically a short apparatus which is connected to a gas supply line which extends underground to a location very close (within about 10 feet) of the structure which it will serve.

In one embodiment of the present invention, the separate piece of natural gas supply pipeline which extends from a distribution line to a location close to the structure can be eliminated by providing a much longer gas carrier pipe on the vented gas riser which will extend without any interruption, joints or couplings a substantial distance (more than 10 feet but possibly in the hundreds of feet) away from the transition head to the location of the distribution line (or to any point a substantial distance away from the transition head). This embodiment essentially eliminates one of the joints or connections or couplings which would otherwise be required and therefore eliminates any possible leaking from such a joint or coupling. By providing a generally cylindrical fluid tight protective casing around the entire length of the carrier pipe, a gas escape passageway is created in an elongate annular space between said carrier pipe and said casing. This annular space is fully closed and contained except for vent provided in the riser transition head. If any fugitive gas leaks from the carrier pipe, such gas it will be trapped in the gas escape passageway. To the extent that the pressure in the gas escape passageway is greater than the atmospheric pressure outside the transition head, the gas will be forced by such positive pressure out of the gas escape passageway though the vent and into the atmosphere.

In this embodiment, it is contemplated that that the protective casing could either be one uninterrupted cylindrical protective casing member or, preferably, may include a gas riser protective casing portion and a pipeline protective casing portion connected together with a boot formed from an elastomeric tubing or other coupling. This allows for the use of a less expensive polyethylene or other plastic pipeline protective casing portion for the majority of the length of the gas carrier pipe with a metallic gas riser protective casing portion for use to protect the vertical portion of the gas carrier line and the short horizontal portion adjacent thereto.

This embodiment, in its simplest form provides a vented gas riser apparatus for use in a system for conducting pressurized gas from a gas supply source line located below ground level to a delivery point disposed above ground level comprising:

a) an elongated gas carrier pipe, said carrier pipe having a first pipe end disposed below ground level and sealingly connected at a first point of connection to said gas supply source line and having a second pipe end disposed above ground and sealingly connected to said delivery point whereby pressurized gas may flow through said carrier pipe from said gas supply source to said delivery point;

b) a generally cylindrical fluid tight protective casing, said casing having a first casing end disposed below ground level and second casing end disposed above ground level, said casing disposed around said carrier pipe and creating a gas escape passageway in an elongate annular space between said carrier pipe and said casing; and c) a riser transition head having a first head end sealingly connected to said delivery point and having a second head end connected to said second casing end, said second head end including at least one vent passageway which provides a fluid connection with said gas escape passageway and with the atmosphere whereby gas which leaks into said gas escape passageway may escape from an otherwise closed and sealed system through said at least one vent into the atmosphere.

Preferably, said first point of connection is located a substantial distance from said second pipe end and said gas supply line is a distribution line which serves a plurality of structures. Preferably, said protective casing includes a gas riser protective casing portion and a pipeline protective casing portion. Said gas riser protective casing portion is preferably formed of a flexible member of galvanized steel coated with a polyvinyl chloride material although it may be formed of a rigid member such as a steel tubing having a protective coating of epoxy or other corrosion resistant material.

Preferably, said protective casing includes a gas riser protective casing portion and a pipeline protective casing portion with said gas riser protective casing portion and said pipeline protective casing portion sealingly connected together with an elastomeric casing boot. Preferably, a polyethylene protective sleeve is also provided around said casing boot.

Preferably, said at least one vent passageway is open to the atmosphere at a location above ground level and said passageway directs the flow of any gas from the escape passageway downwardly toward the ground level.

The present invention preferably provides a vented gas riser for use in a system for conducting pressurized gas through a gas carrier pipe from a gas supply source line located below ground level to a delivery point disposed above ground comprising:

a) a fluid tight protective casing disposed around said carrier pipe and creating a gas escape passageway in an elongate annular space between the carrier pipe and the casing whereby any gas which leaks from gas carrier pipe is contained within said gas escape passageway; and c) a riser transition head, which includes at least one vent passageway which provides a fluid connection with said gas escape passageway and with the atmosphere such that any gas which leaks into gas escape passageway is directed through the at least one vent and into the atmosphere.

The present invention preferably provides a vented gas riser apparatus comprising a generally cylindrical vented riser head positioned on an outer diameter of an above ground end of a gas riser protective casing, said riser head having a plurality of crimps formed around a circumference of the riser head, said crimps connecting said riser head to said casing, said crimps also forming at least one vent passageway channel between adjacent crimps whereby said at least one vent passageway channel provides a passageway between an interior of the casing and the outside atmosphere so that natural gas located inside said casing may be vented to the atmosphere through said at least one vent passageway channel.

DETAILED DESCRIPTION OF THE PREFERRED EMBODIMENTS

Figure 1:
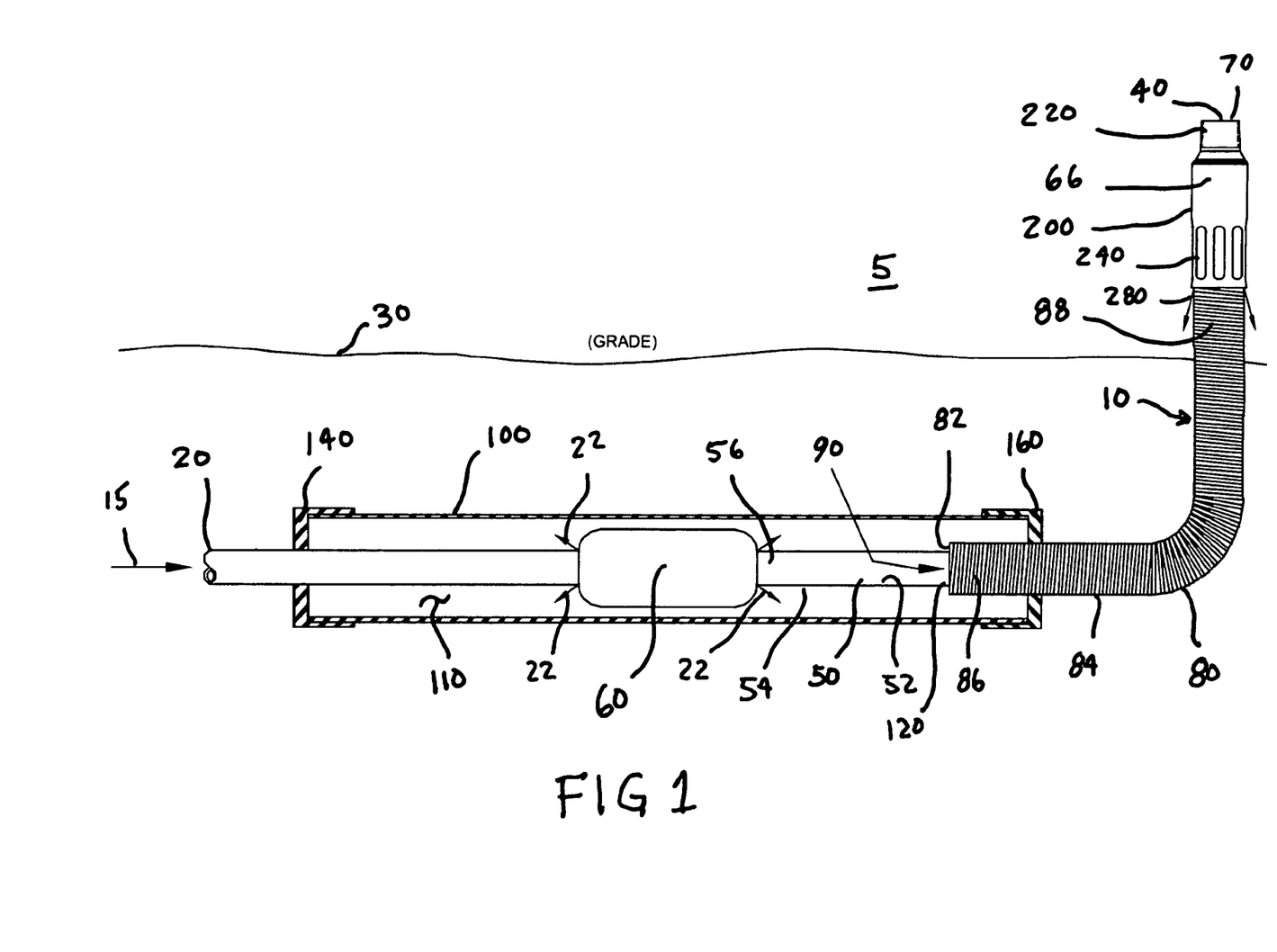
FIG. 1 is a schematic view of a first embodiment of the present invention showing a vented riser transition head above ground level, a riser casing and a containment chamber located below ground level.
Figure 2:
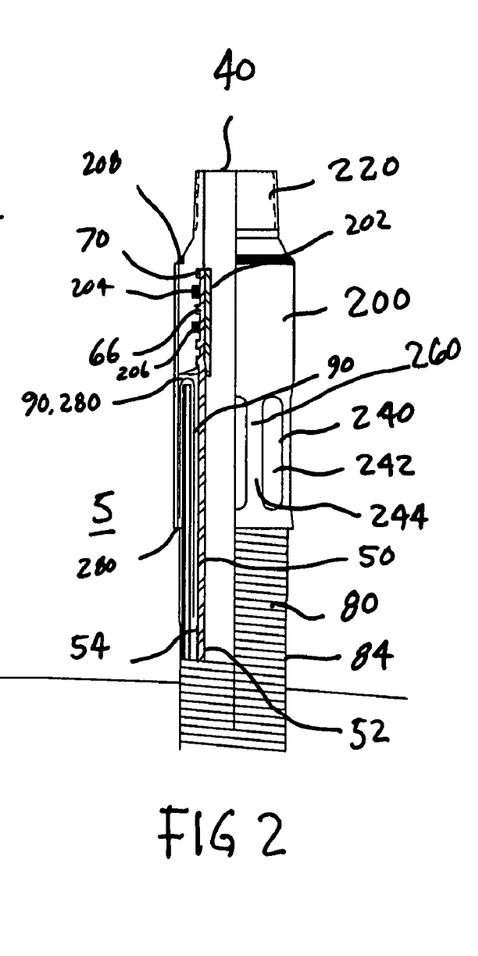
FIG. 2 is a blowup view of the riser transition head of FIG. 1, partly in section showing the details of the gas escape passageway and at least one vent passageway.
Figure 2A:
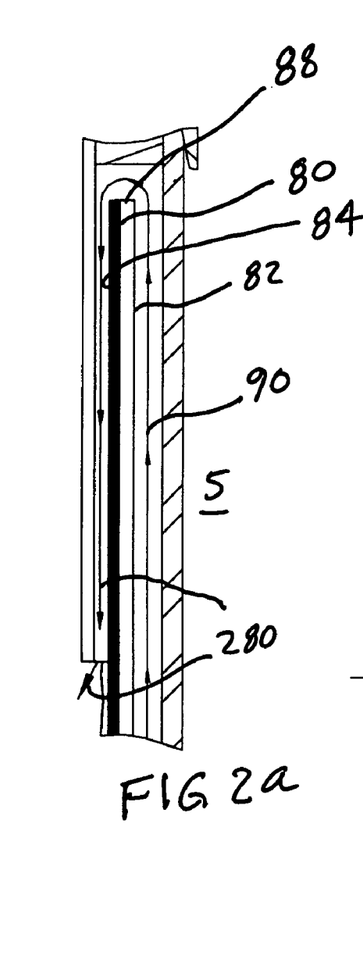
FIG. 2a is an enlargement of a portion of FIG. 2 which better shows the details of the gas escape passageway and at least one gas vent passageway.

Referring first to FIGS. 1, 2 and 2a, the preferred embodiment of the present invention is described.

A vented gas riser apparatus 10 is provided for use in a system for conducting pressurized gas 15 from a gas supply source line 20 located below ground level 30 to a delivery point 40 disposed above ground level 30 includes the following components:

a) an elongated gas carrier pipe 50, having an inner diameter 52 and an outer diameter 54, having a first pipe end 56 disposed below ground level 30 and sealingly connected at a first point of connection 60 to the gas supply source line 20 and a second pipe end 66 disposed above ground level 30 and sealingly connected at a second point of connection 70 to the delivery point 40 whereby pressurized gas may flow through carrier pipe 50 adjacent inner diameter 52 from said gas supply source 20 to delivery point 40;

b) a generally cylindrical fluid tight gas riser protective casing 80, having an inner diameter 82 larger than outer diameter 54 and having a outer diameter 84, casing having a first casing end 86 disposed below ground level 30 and a second casing end 88 disposed above ground level, casing 80 disposed around 50 and creating a gas escape passageway 90 in a space between outer diameter 54 and inner diameter 82;

c) a containment chamber 100 disposed below ground level, surrounding first point of connection 60 creating a space 110 which has a fluid connection 120 to gas escape passageway 90 whereby any gas 22 which may leak from first connection point 60 will be captured by containment chamber 100 and directed into said gas escape passageway 90, said containment chamber 100 having a first chamber end 140 sealingly connected to gas supply source line 20 at a location upstream from first point of connection 60 and having a second chamber end 160 connected to riser casing 80 outer diameter 84 at a location downstream from first point of connection 60; and d) a riser transition head 200, having a first head end 220 sealingly connected to delivery point 40 and a second head end 240 including a transition head sleeve 260 connected to the casing 80 outer diameter 84 of second casing end 88, second head end 240 including at least one vent passageway 280 which provides a fluid connection with gas escape passageway 90 and with the atmosphere 5 whereby any gas which leaks into said containment chamber 100 is directed through gas escape passageway 90 and through at least one vent 280 and into the atmosphere 5 at a known location above ground where it can be detected and at least partially disbursed.

Referring specifically to FIG. 1, natural gas 15 flows into the gas supply source line 20. The gas supply source line 20 is connected to an elongated gas carrier pipe 50 at a first connection location 60 which may be formed by either mechanical means or by melting the ends of the pipes together or by various other known means. Both the gas supply source line 20 and the elongated gas carrier pipe 50 are formed of polyethylene. As can be seen, the first point of connection 60 is fully contained within a polyethylene tube member 100 which includes a rubber cap 140 on the gas supply source line 20 making a sealing connection therewith and is enclosed by rubber cap 160 on the opposite end which makes a sealing connection with the out diameter surface 84 of the riser casing 80.

The riser casing 80 if in the form of a flexible member is typically formed of a galvanized steel coated with a polyvinyl chloride material. If the riser casing 80 is formed of rigid material it is typically in the form of steel tubing having an epoxy coating. Any natural gas 22 which might leak from the first connection point 60 will flow into a fully enclosed chamber 110 which has only one egress therefrom namely a gas escape passageway 90 which is formed in an elongate annular space between the carrier pipe 50 outer diameter surface 54 and an internal diameter surface 82 of the casing 80.

The concept of the invention is to provide underground containment of any small leak which might occur at the first connection point 60. As any small degree of gas pressure might build up in the containment chamber space 110 the path of least resistance for escape of the gas from the chamber space 110 is the gas escape passageway 90 thus directing the gas upwardly through the riser casing 80 to the riser transition head 200. As can be seen from both FIG. 2 and FIG. 2a, the flow of any leaked gas flows upwardly through the gas escape passageway 90 and into the vent passageway 280. As can be seen, the gas moves in an upward direction while in the gas passageway 90 until it reaches the vent passageway 280 where the passageway then makes a 180 degree bend and then is directed downwardly through the vent passageway 280. This results in the gas being directed out of the bottom of the vent passageway 280 toward the surface of the ground 30 to the open atmosphere 5.

Other details of the steel riser transition head 200 include the provision of a metallic stiffener 202, a double primary o-ring seal 204 and 206 as well as polyethylene pipe restraint grooves 66 to make the connection to the delivery point 40 at location 70. The first head end 220 of the riser head 200 is connected, preferably by welding, to the sleeve 260 by means of a frustoconical transition member 208.

As can be seen from FIG. 2, a series of crimps 242 are provided in the transition head sleeve 260 at approximately eight (8) locations around the surface of the sleeve 260. This results in eight (8) different channels 244 being formed between adjacent crimps 242 which form the vent passageways 280. By controlling the geometry of the crimping machine as well as the pressure applied it is possible to provide vent passageways with very controlled clearances. Clearances in the neighborhood of 0.001 to 0.002 inches are believed to be a sufficient size to allow for the escape of any gas which might leak. Such a small passageway also reduces the likelihood that bugs, debris or dirt might somehow enter into the space between riser casing and the gas carrier pipe.

While we have specifically shown a transition head 200 which provides a vent passageway 280 formed at locations 244 between adjacent crimps 242, it is to be understood that the present invention will operate if a venting to the outside atmosphere 5 is provided by any means and at any location above ground. This could be a simple as simply drilling a hole at desired locations into the casing sleeve 260. The embodiment shown in FIG. 2, is preferred, however, because of its ability to resist the entry of dirt, water, debris, bugs and the like.

Figure 3:
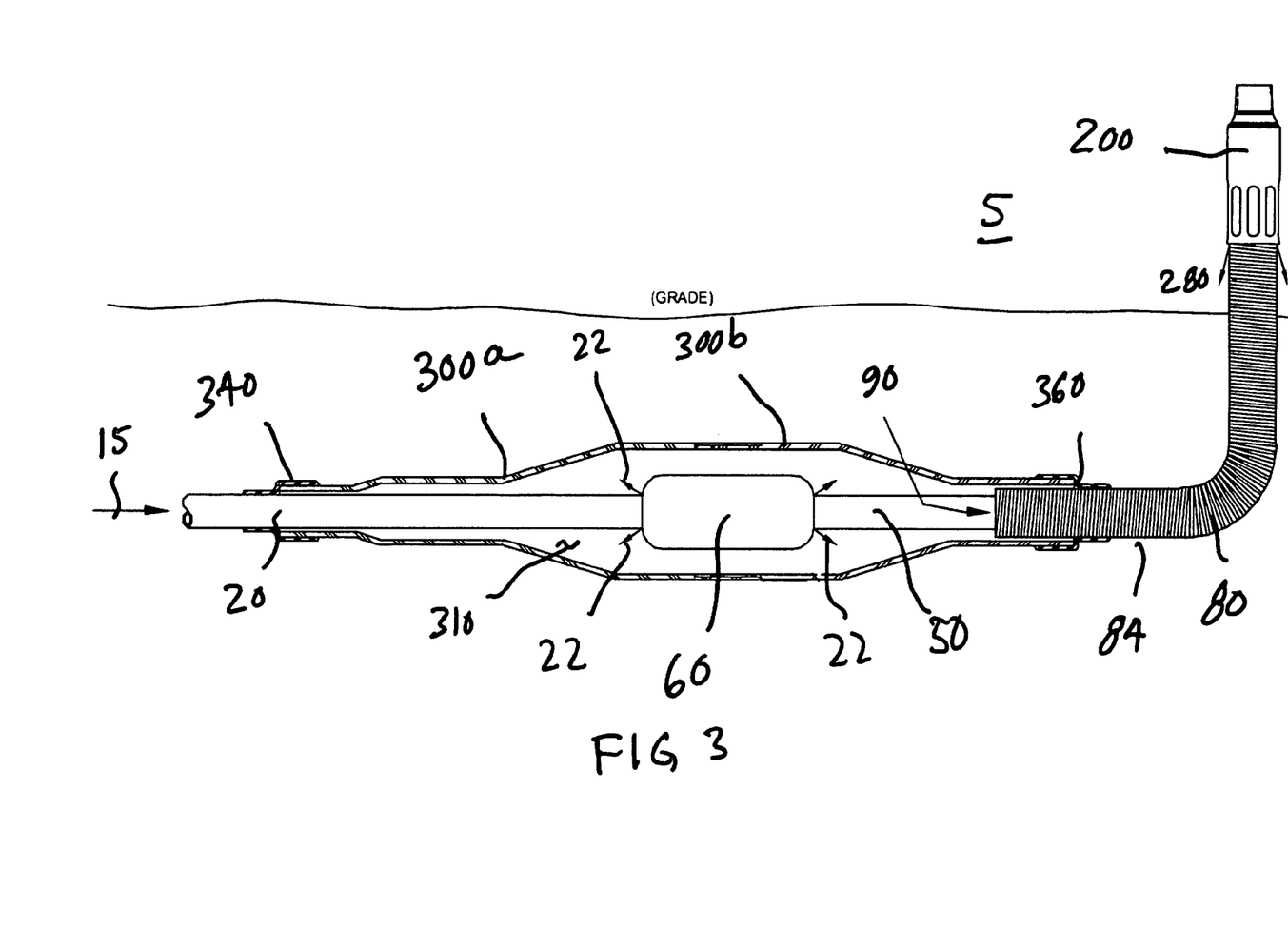
FIG. 3 shows an alternative embodiment of a containment chamber formed of two chamber halves 300a and 300b.

Referring now to FIG. 3, an alternative containment chamber is shown. All of the components are essentially identical to those shown in FIG. 1 except that in FIG. 3 the containment chamber 100 of FIG. 1 is replaced with a different style of containment chamber 300a, 300b in FIG. 3. In this embodiment, a containment chamber is formed by a first containment chamber half 300a and a second containment chamber half 300b which are slip fit together with an o-ring over the location of the first connection 60. This forms a containment chamber space 310. A rubber sleeve boot is dimensioned at 340 to provide an interference fit over both the pipe 20 and the containment sleeve 300a. An additional rubber boot 360 is provided to provide a seal at the opposite end onto the outer diameter surface 84 of the riser casing 80. In this instance the containment chamber container halves 300a and 300b are preferably premolded out of a polyethylene material.

Figure 4:
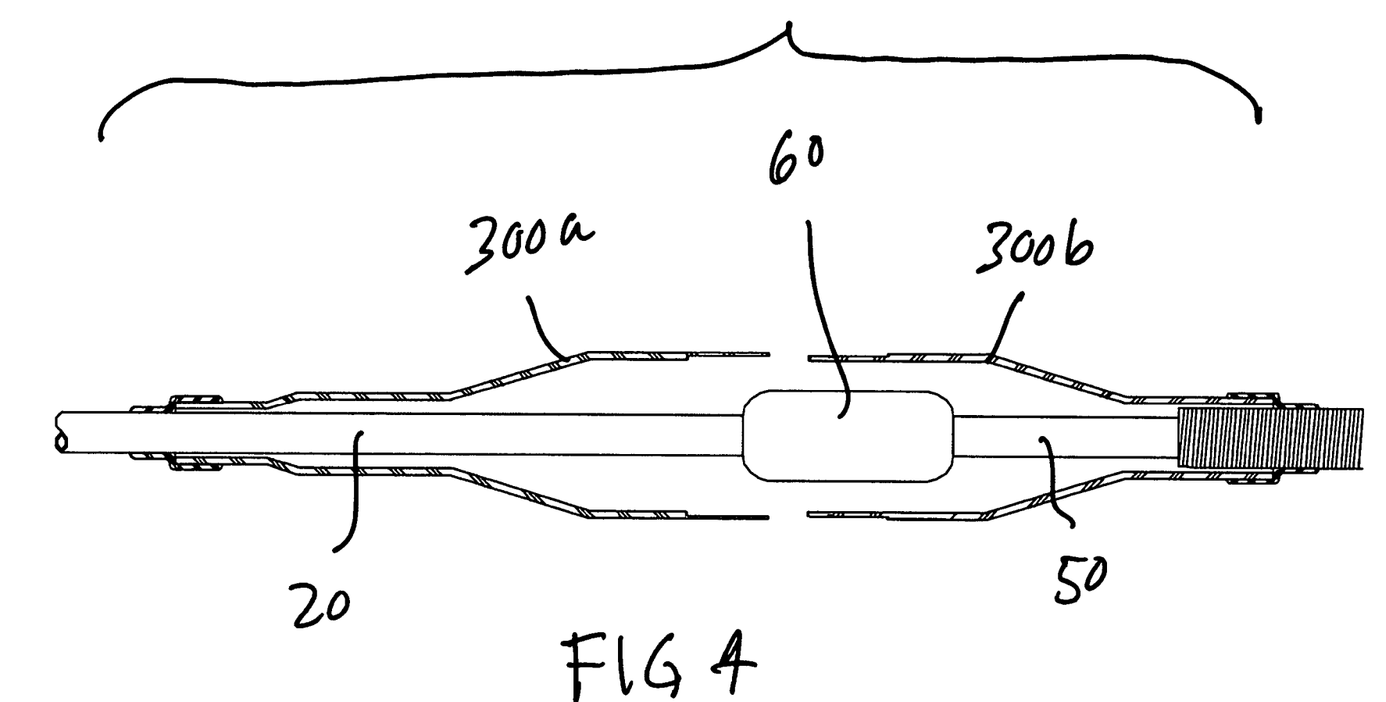
FIG. 4 shows the containment chamber of FIG. 3 with the containment chamber halves not yet connected together.

FIG. 4 shows the containment chamber halves 300a and 300b in a separated spaced-apart position before they are slip fitted together to form the chamber space 310.

Figure 5:
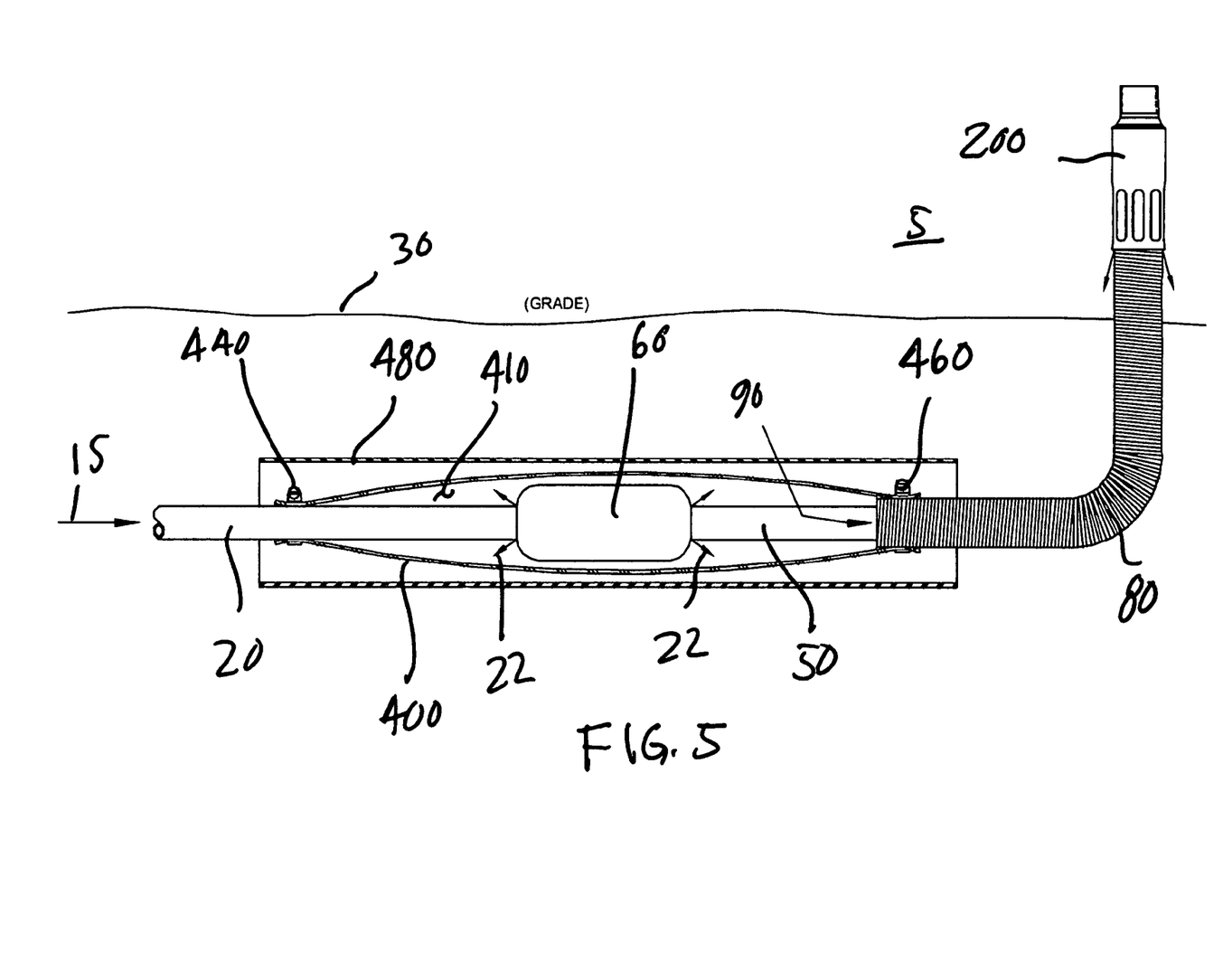
FIG. 5 is a schematic view of another embodiment of a containment chamber 400 having a protective casing 480 thereon.

FIG. 5 shows yet another embodiment of the present invention wherein the containment chamber 100 of FIG. 1 is replaced by a containment chamber 400. Further an additional protective casing 480 is provided over the containment chamber 400 which in this instance is preferably formed of an elastomeric tubing material of the shape shown in FIG. 5. The containment chamber is connected to the gas supply source line 20 at a first end by a clamp 440 and is attached to the outer diameter surface 84 of the riser casing 80 by a clamp 460. In this case, the containment chamber 400 provides a container space 410 into which the gas is initially captured. As in all embodiments of the present invention, the easiest path of egress which offers the least resistance for a small leak volume is through the gas escape passageway 90.

Figure 6:
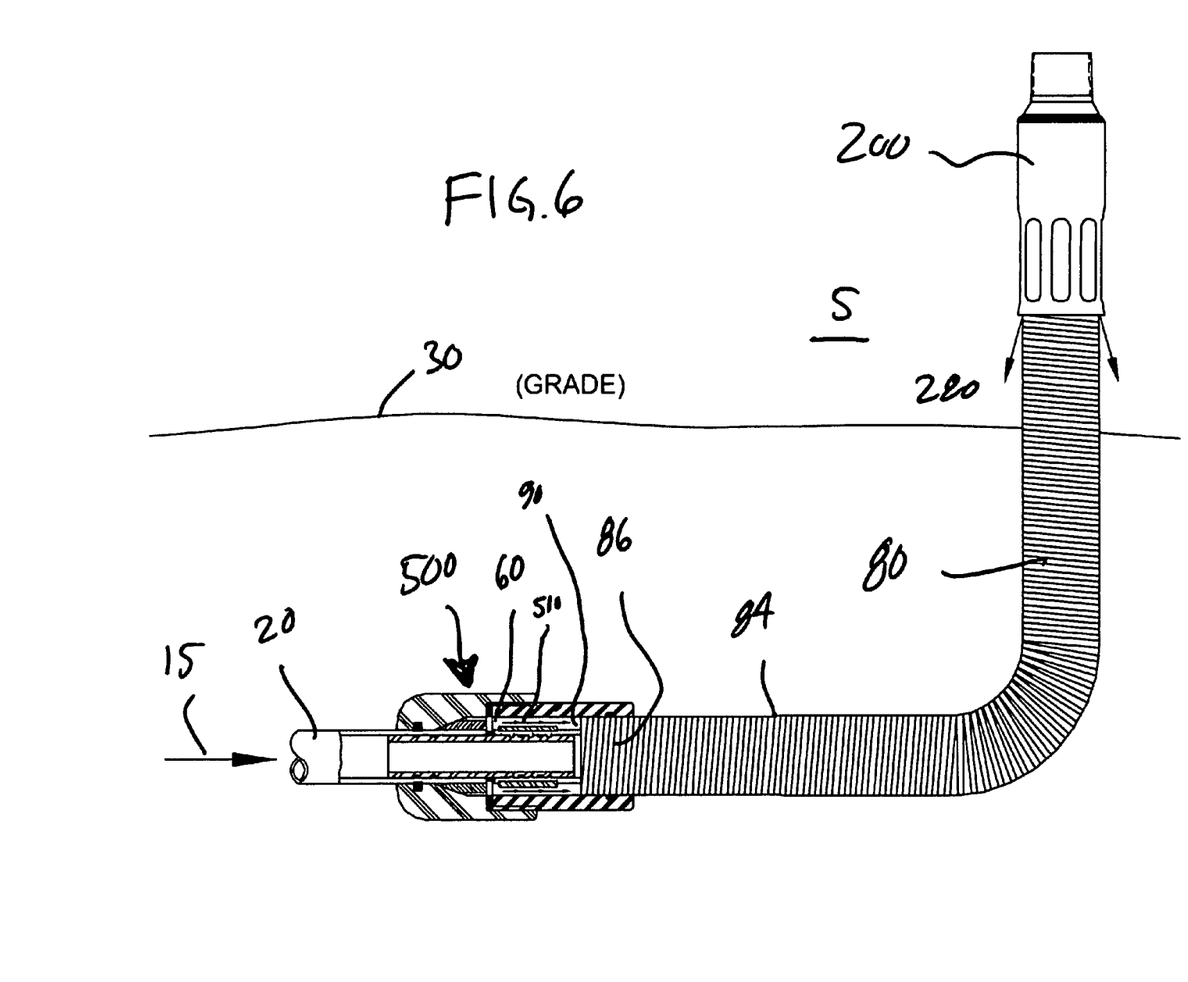
FIG. 6 is a view of yet another embodiment of the containment chamber of the present invention this time in the form of a coupling 500.
Figure 7:
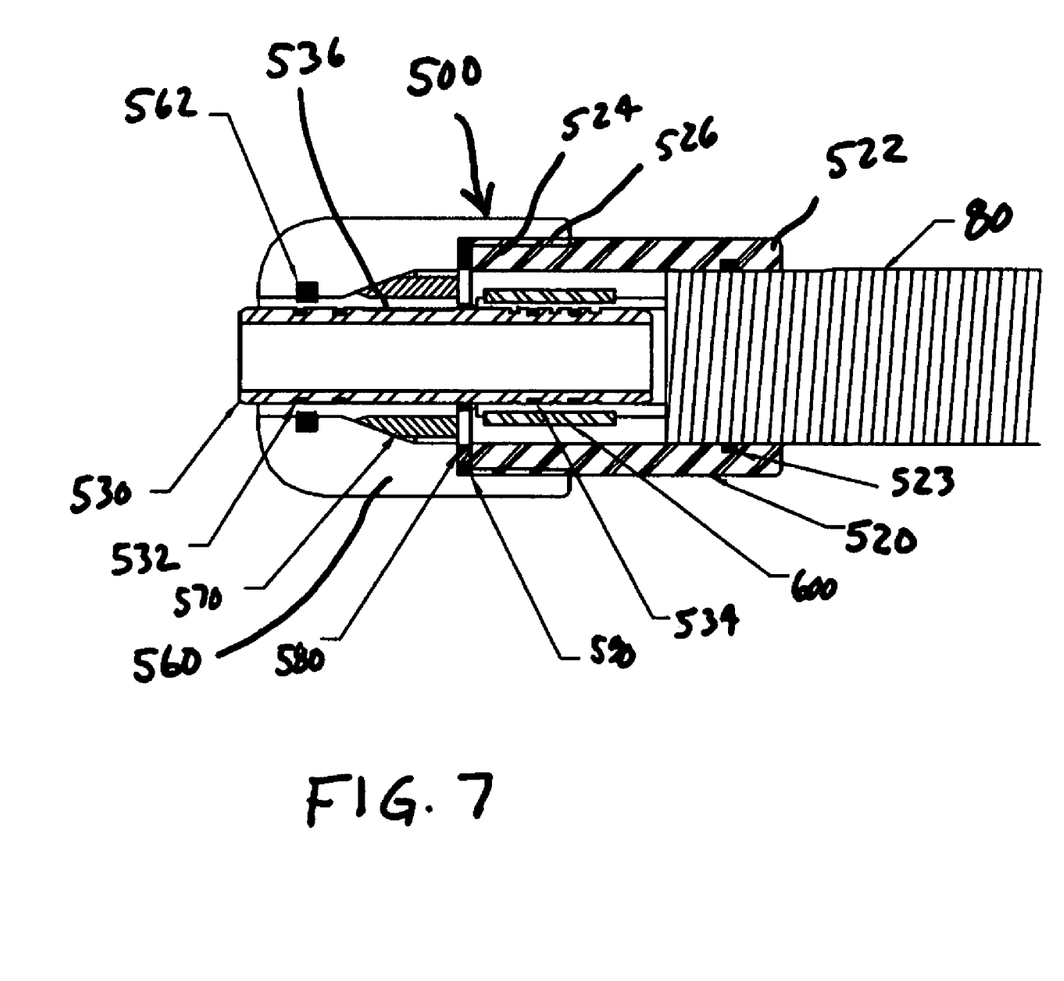
FIG. 7 is a cross-sectional view showing the various component parts of the coupling 500 of FIG. 6.
Figures 8A, 8B:
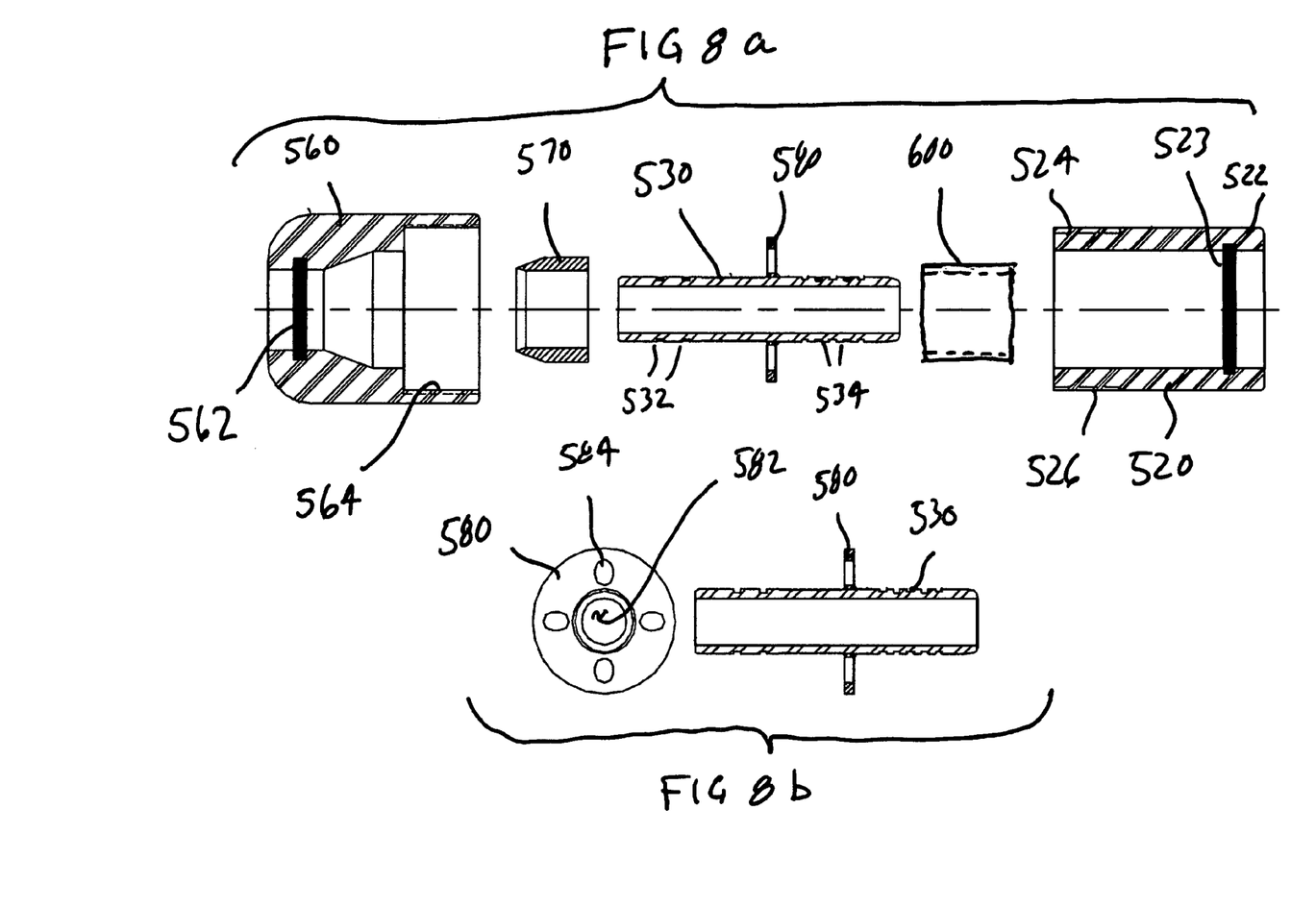
FIG. 8a shows the component parts of the coupling 500 of FIG. 6 in an exploded form.
FIG. 8b shows a top plan view of a load ring 580 as welded onto a stiffener 530.

Referring to FIGS. 6, 7, 8a and 8b a final specific embodiment of the containment chamber will be addressed. In this case, the containment chamber 100 of FIG. 1 is replaced by a containment coupling 500 as shown in FIG. 6. The coupling itself includes a coupling sleeve 520 having a first sleeve end 522 and a second sleeve end 524 the sleeve 520 preferably formed of a PA-11 Rilsan material which is a form of polymer. An o-ring 523 is provided at end 522 to make a sealing engagement with the riser casing 80. The end 524 of the sleeve 520 is threaded as shown at 526. A coupling nut 560 which includes a moisture vapor seal 562 and an internally threaded end 564 is provided. As best shown in FIGS. 8a and 8b a split compression ring 570 is provided as well as a load ring 580 which is welded onto a stiffener 530. The stiffener 530 is provided with a series of notches 532 and 534 which aid in the gripping of said stiffener to the inside of the gas supply source line 20 and the carrier pipe 50 which are connected together by the stiffener 530. A crimp sleeve 600 is also provided.

The details of the load ring are shown in FIG. 8b which includes a central opening 582 to allow the load ring to be mounted onto the stiffener 530 as well as a series of openings 584 which allow for the passage of gas through the load ring. In this case, as best shown in FIG. 6 any gas which might leak at the location of the connection point 60 will be trapped within the space 510 inside coupling 500 the only egress of which is into the gas escape passageway 90 as with all of the other embodiments of the present invention.

A structure and operation of the coupling 500 may be more easily understood by reference to Wartluft et al., U.S. Pat. No. 5,692,785 and Wartluft, U.S. Pat. No. 5,366,260 which teach the provision of pipe couplings which use some of the same principles utilized in the present invention.

As will now be apparent in view of the various embodiments of the containment chamber which have been shown, it will be obvious to those of ordinary skill in the art that a variety of other underground containment chambers could be utilized provided that they include the ability to completely seal the gas within the chamber allowing only one egress point namely the gas escape passageway 90. It is to be understood that because the gas escape passageway 90 and vent passageway 280 do in fact vent to the atmosphere 5, that there will never be a large buildup of pressurized gas within the containment chamber. Because of this, the types of seals or rubber boots on opposite ends of the containment chamber need not provide a high level of sealing as they will never need to deal with such high pressures.

Figure 9:
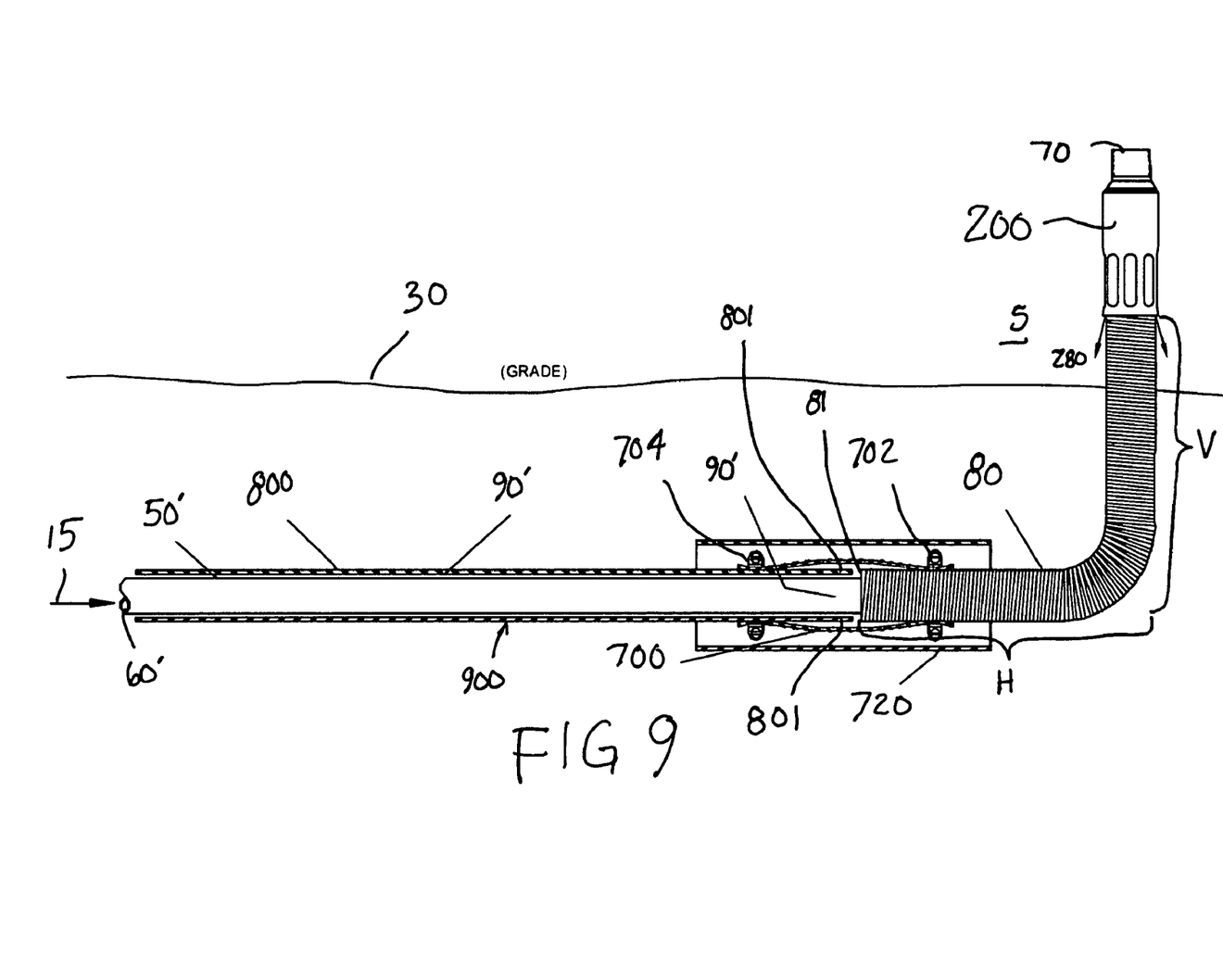
FIG. 9 is a cross-sectional view showing an alternative embodiment of the invention wherein the gas carrier pipe extends a substantial distance away from the riser transition head and showing a protective casing which includes a gas riser protective casing portion and a pipeline protective casing portion.

Referring specifically to FIG. 9, an alternative embodiment of the invention will be more fully described. The embodiment of FIG. 9 has the same transition head 200 as the other embodiments. The gas riser protective casing portion 80 of protective casing 900 is formed of a flexible member of galvanized steel coated with a polyvinyl chloride material. It includes a vertical portion V with is typically between 2 and 3 feet in length and a horizontal portion H which is typically less than 5 feet in length and preferably about 2 feet.

An extended gas carrier pipe 50' is shown to extend from a first connection point 60' to the transition head 200. The first connection point 60' is located a substantial distance from the transition head 200 and also extends a substantial distance (greater than 10 feet) beyond the end 91 of the gas riser protective casing portion 80. The gas carrier pipe in this embodiment typically extends continuously without any splices, joints or couplings all the way from the transition head 200 to a distribution line 950 (see FIG. 10) located at the street or curb near the structure. Thus, the carrier pipe 50' may be any length between about ten feet to hundreds if not thousands of feet.

A pipeline protective casing portion 800 of the protective casing 900 is preferably formed of polyethylene and extends from the first connection point 60' of the gas carrier pipe 50' to the end 81 of the gas riser protective casing portion 80 of protective casing 900. Thus, pipeline protective casing portion 800 covers the portion of the gas carrier pipe not covered by gas riser protective casing 80. End 81 of gas riser protective casing portion 80 is sealingly connected to end 801 of pipeline protective casing portion 800 by an elastomeric boot 700 which is clamped onto end 81 with clamp 702 and clamped onto the end 801 with clamp 704. A protective polyethylene sleeve 720 is provided around the boot 700 to prevent crushing or damage to the boot 700 from the dirt and earth which covers this connection.

This embodiment works essentially the same as the others with any gas which leaks from gas carrier pipe 50' being trapped in the escape passageway 90' formed in the annular space between the outside diameter of the gas carrier pipe 50' and the inside diameter of the protective casing 900 (including casing portions 800, and 80 and boot 700). This passageway 90' may closed off and sealed at the location of the first connection end 60' and is thus completely sealed off and contained with the exception of vents 280 provided in transition head 200. Alternatively, end 60' can be left unsealed at this location since it is located a substantial distance from the structure. Since end 60' is located near the distribution line 950 (see FIG. 10), a leak at this location would likely be found during routine monitoring of the distribution line by the gas company. In either case, as any gas pressure builds up in the escape passageway which exceeds the pressure of the outside atmosphere 5, the gas within the escape passageway is expelled through the vents 280 or through the end of the escape passageway at end 62' adjacent to at the point of connection at the gas supply main. This allows gas, which might otherwise migrate and collect at an unknown and unsafe location, to be vented and disbursed into the atmosphere 5 at a location where the leak can more easily be smelled or otherwise easily detected or in the vicinity of the gas supply main in the street away from any structures.

Figure 10:
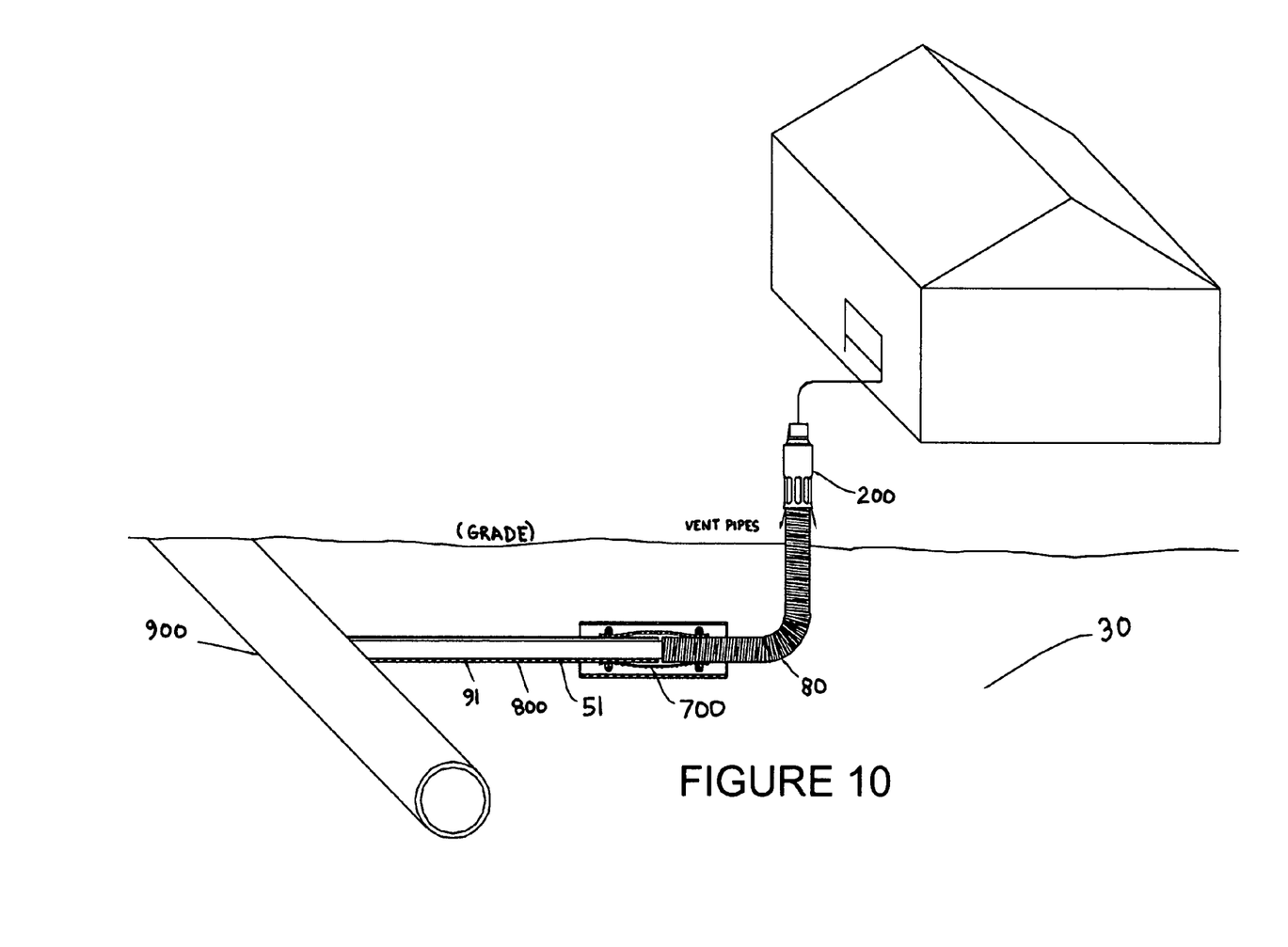
FIG. 10 is a diagrammatic view showing the embodiment of FIG. 9 and also showing yet another embodiment wherein the protective casing has a gas carrier pipe and a gas riser casing which each extend a substantial distance away from the riser transition head without any joint or coupling.

FIG. 10 is a diagrammatic view (not even remotely drawn to scale) which shows that the gas carrier pipe 50' to house A is protected with a protective casing portion 800. The gas riser protective casing portion 80 extends from the head 200 only a short distance to the boot 700 and the pipeline casing portion 800 extends from the boot 700 to the first connection point again located at the location of a distribution line 950. Thus, the casing portion 80 and the pipeline casing portion 800 provide a passageway 90' around the outer diameter of the carrier pipe 50'. In an alternative embodiment (not shown), the protective casing portion 80 can extend all the way from the head 200 to the distribution line 950 thereby eliminating the need for the boot 700 and line casing portion 800 and thus the casing portion 80 alone created a passageway 90' around the outer diameter of the carrier pipe 50'. This embodiment is not presently preferred because of the high cost of the casing portion material 80 relative to the cost of the line casing portion material 800.

Yet another embodiment of the present invention which is not the presently preferred method but which is still very useful because of the low cost of implementation will now be described. The embodiment shown in FIG. 9, for example, utilizes an escape passageway 90' formed in the annular space between the outside diameter of the gas carrier pipe 50' and the inside diameter of the protective casing 900 (including casing portions 800, and 80 and boot 700). The theory of the FIG. 9 embodiment is that fugitive gas is directed inside the escape passageway and is allowed to vent only at one end or the other. The cost of providing all of these components may create a competitive disadvantage when trying to compete with installations which do not provide any venting solution. A cost effective compromise which provides some benefit at a reduced cost can be achieved by simply eliminating the casing portion 800 the boot 700 from the FIG. 9 embodiment. In this case the casing 80 would simply end inside of sleeve 720 which would prevent dirt from clogging the open end. In this case, a passageway is only provided within the casing 80. The theory of this embodiment is that if a leak were to occur anywhere along the line 50' in an area which did not have a protective casing portion 800, even without such a protective casing, there is still a good chance that the fugitive gas or a substantial portion of the same would flow along the existing pipe and into the open end of casing 80. The disturbance to the dirt from backfilling around the pipeline can cause such dirt to be less dense and more porous than adjacent undisturbed earth. Further, the mere presence of a pipeline creates a natural channel in the dirt through which the gas may flow. Flow migration of gas along an existing pipeline is a common occurrence when leaks occur. By merely providing a vented riser according to the present invention (without any casing 800 or boot 700), one can prevent flow of gas into the structure and rather direct such gas into the atmosphere at a safe above ground location.

Figure 11:
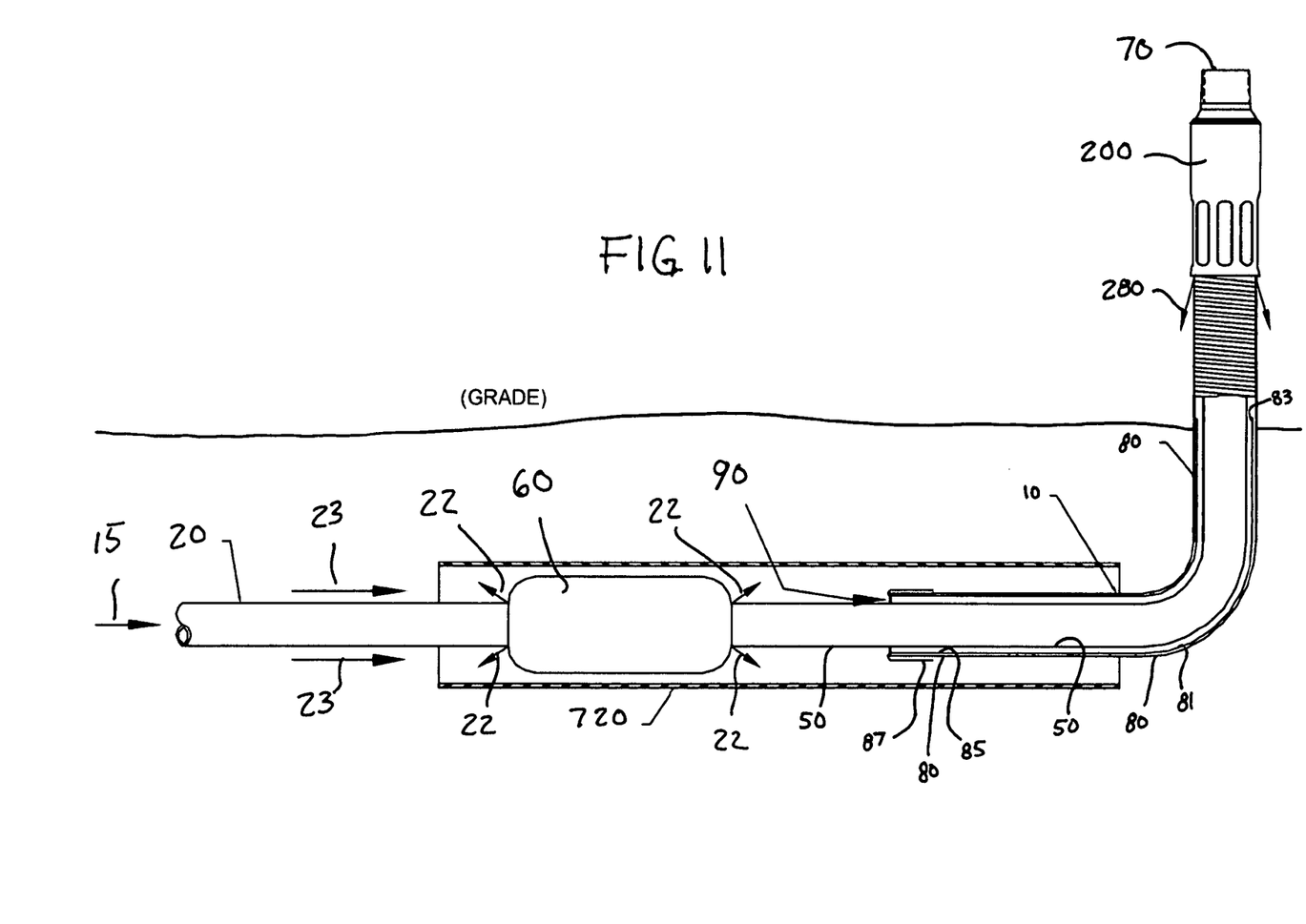
FIG. 11 is a diagrammatic view showing an embodiment of the invention with includes the provision of an annular space through which fugitive gas may escape to atmosphere.

The gas risers that are commonly used today generally include a moisture seal at the bottom (underground) end of the riser's protective casing. The purpose of the moisture seal is to prevent groundwater and other contaminants from entering the radial space between the carrier pipe and the inside diameter of the casing (flexible or rigid). The moisture seal on today's risers effectively precludes any gas which may accumulate underground in the vicinity of the bottom of the riser from entering the riser. The embodiment of the present invention as show in FIG. 11 specifically includes the provision of annular space 90 through which fugitive gas 22, 23 may escape to atmosphere. When the vented riser 10 is used in its simplest form without a pressure containment boot (FIG. 5 shows a pressure containment boot 400 being present and FIG. 11 shows a vented riser without such a boot) or without an extended protective casing (FIG. 9 shows an extended protective casing 800 and FIG. 11 shows a vented riser 10 without such an extended casing), the underground end of the casing is purposely left open at 90 so that when gas 15 entering line 20 because of leakage at any location becomes fugitive gas 22, 23, such fugitive gas 22, 23 has a path of least resistance to travel to get to the atmosphere through passageway 90 and vents 280. Because passageway 90 is purposely left open, groundwater could collect in the annular space 90 between the carrier pipe 50 and the inside diameter of the protective casing 80 (which, for both the flexible risers and the rigid risers, is metallic).

As a means of protecting the inside of the casing 80 from corrosion as the result of possible moisture buildup within that annular space 90, a rubber liner 81 can be provided that will be tubular in form and will be installed between the carrier pipe 50 and the ID of the protective casing 80. The rubber liner 81 will be stretched over the open end of the riser casing 80 and doubled back as shown at 87 over the OD of the end of the casing 80 so as to hold first end 85 of the liner 81 in place. The liner 81 forms a protective barrier between moisture that may accumulate in the riser casing 80 and the metallic ID of the casing. The rubber liner 81 preferably extends far enough into the riser casing (about 30 inches) and terminates at second end 83 of liner 81. The second end 83 is preferably positioned such that the leading edge end 83 of the liner 81 will be at or above the ground level, effectively precluding any water from reaching the metallic ID of the casing 80 even in a high water table environment. It is very important to note that the wall thickness and the fit of the rubber liner 81 relative to both the carrier pipe 50 and the protective casing 80 ID is such that the passageway 90 for gas travel is absolutely maintained (plenty of clearance between the carrier pipe 50 and the ID of the rubber liner 81). While not necessarily an essential feature of the present invention, the provision of a liner 81 will reduce possible increased corrosion of a riser 10 that doesn't include a moisture seal.

It is to be understood that while certain forms of the present invention have been illustrated and described herein, the present invention is not to be limited to the specific forms or arrangements of parts described and shown.

We claim:

1. A vented gas riser apparatus comprising a generally cylindrical vented riser head positioned on an outer diameter of an above ground end of a gas riser protective casing which is located around a carrier pipe, said riser head having a plurality of crimps formed around a circumference of the riser head, said crimps connecting said riser head to said casing, said crimps also forming at least one vent passageway channel between adjacent crimps and defined by a clearance between the casing outer diameter and the riser head inner diameter wherein said at least one vent passageway channel provides a passageway from the space between the carrier pipe outer diameter and the casing inner diameter to the outside atmosphere so that natural gas located inside said casing may be vented to the atmosphere through said at least one vent passageway channel.

2. A vented gas riser head according to claim 1 wherein said at least one vent passageway channel further comprises at least five vent passageways formed between adjacent crimps.

3. A vented gas riser head according to claim 1 wherein the size of the at least one vent passageway channel is controlled by the geometry and pressure applied by a crimping machine whereby a desired flow of gas can be allowed to flow out of said at least on vent passageway with a minimum risk of contamination by dirt, bugs or other debris.

4. A vented gas riser head according to claim 1 wherein said at least one vent passageway is open to the atmosphere at a location above ground level and said passageway directs the flow of any gas from the riser casing downwardly toward the ground level.

5. A vented gas riser apparatus comprising a generally cylindrical vented riser head and a gas riser protective casing, said riser head positioned on an outer diameter of an above ground end of said casing which is located around a carrier pipe, said riser head having a plurality of crimps formed around a circumference of the riser head, said crimps connecting said riser head to said casing, said crimps also forming at least one vent passageway channel between adjacent crimps and defined by a clearance between the casing outer diameter and the riser head inner diameter wherein said at least one vent passageway channel provides a passageway from the space between the carrier pipe outer diameter and the casing inner diameter to the outside atmosphere so that natural gas located inside said casing may be vented to the atmosphere through said at least one vent passageway channel, said gas riser protective casing also having a rubber liner provided adjacent to the casing inner diameter at least along a portion of the length of said casing.

6. A vented gas riser apparatus according to claim 5 wherein a first end of said rubber liner is doubled back over an outer diameter surface of said protective casing.

7. A vented gas riser apparatus according to claim 5 wherein a second end of said rubber liner is located above ground level.

* * * * *